United States Patent
Emori et al.

(10) Patent No.: US 9,748,537 B2
(45) Date of Patent: Aug. 29, 2017

(54) STORAGE BATTERY APPARATUS

(75) Inventors: Akihiko Emori, Hitachi (JP); Youhei Kawahara, Hitachi (JP); Takahiro Kawata, Ome (JP); Akihiko Kudo, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 1269 days.

(21) Appl. No.: 11/836,891

(22) Filed: Aug. 10, 2007

(65) Prior Publication Data

US 2008/0076011 A1  Mar. 27, 2008

(30) Foreign Application Priority Data

Sep. 27, 2006 (JP) .................. 2006-261650

(51) Int. Cl.
| | |
|---|---|
| H01M 2/10 | (2006.01) |
| H01M 10/60 | (2014.01) |
| H01M 10/61 | (2014.01) |
| H01M 10/63 | (2014.01) |
| B60L 11/18 | (2006.01) |

(Continued)

(52) U.S. Cl.
CPC ......... *H01M 2/1072* (2013.01); *B60L 3/0046* (2013.01); *B60L 8/003* (2013.01); *B60L 11/14* (2013.01); *B60L 11/187* (2013.01); *B60L 11/1874* (2013.01); *B60L 11/1879* (2013.01); *H01M 10/486* (2013.01); *H01M 10/60* (2015.04); *H01M 10/61* (2015.04); *H01M 10/613* (2015.04); *H01M 10/63* (2015.04); *H01M 10/633* (2015.04); *B60L 2240/545* (2013.01); *H01M 10/656* (2015.04); *H01M 10/6563* (2015.04); *H01M 10/6566* (2015.04); *H01M 10/6567* (2015.04); *Y02T 10/70* (2013.01); *Y02T 10/705* (2013.01);

(Continued)

(58) Field of Classification Search
CPC ........................... Y02E 60/12; H01M 2/1072
USPC ................................................... 429/62, 20
See application file for complete search history.

(56) References Cited

U.S. PATENT DOCUMENTS

| | | |
|---|---|---|
| 6,377,880 B1 | 4/2002 | Kato et al. |
| 7,332,244 B2 * | 2/2008 | Uemoto et al. ............... 429/185 |

(Continued)

FOREIGN PATENT DOCUMENTS

| | | |
|---|---|---|
| EP | 1 786 058 | 5/2007 |
| JP | 09-289701 | 11/1997 |

(Continued)

OTHER PUBLICATIONS

Office Action issued in Chinese Patent Application No. 2007101408889 on Jul. 10, 2009.

*Primary Examiner* — Ula C Ruddock
*Assistant Examiner* — Anna Korovina
(74) *Attorney, Agent, or Firm* — Baker Botts L.L.P.

(57) ABSTRACT

There is provided a highly reliable storage battery apparatus which can diagnose the status of a temperature detection unit and a cooling unit. In the storage battery apparatus comprising a battery module including one or more batteries, a plurality of temperature detection units and a cooling unit cooling the battery module, the temperature detection units measure, at least, the temperature of the cooling medium inputted to the storage battery apparatus, the temperature of the cooling medium outputted from the storage battery apparatus, and the temperature of at least one of the batteries and the battery module.

19 Claims, 8 Drawing Sheets (51) Int. Cl.
*H01M 10/48* (2006.01)
*B60L 3/00* (2006.01)
*B60L 8/00* (2006.01)
*B60L 11/14* (2006.01)
*H01M 10/633* (2014.01)
*H01M 10/613* (2014.01)
*H01M 10/6563* (2014.01)
*H01M 10/6567* (2014.01)
*H01M 10/6566* (2014.01)
*H01M 10/656* (2014.01)

(52) U.S. Cl.
CPC ........ *Y02T 10/7005* (2013.01); *Y02T 10/7077* (2013.01); *Y02T 10/7083* (2013.01)

(56) References Cited

U.S. PATENT DOCUMENTS

2003/0064283 A1* 4/2003 Uemoto .............. H01M 2/0202
                                                    429/149
2004/0257089 A1   12/2004 Aridome
2006/0080986 A1    4/2006 Inoue
2006/0172188 A1*  8/2006 Okuda .................. B60L 3/0046
                                                    429/120

FOREIGN PATENT DOCUMENTS

| JP | 10-106638 A | 4/1998 | |
| JP | 10106638 | * 4/1998 | ............ H01M 10/50 |
| JP | 10-201121 A | 7/1998 | |
| JP | 2001-155789 | 6/2001 | |
| JP | 2003-109637 | 4/2003 | |
| JP | 2003-254839 A | 9/2003 | |
| JP | 2005-287091 A | 10/2005 | |
| JP | 2005-293971 A | 10/2005 | |
| WO | WO 2006/022362 | 3/2006 | |

* cited by examiner

STORAGE BATTERY APPARATUS

BACKGROUND OF THE INVENTION

Field of the Invention

The present invention relates to a storage battery apparatus including a battery such as a lithium secondary battery, a lead battery, a nickel-hydrogen battery, and an electric double layer capacitor, and an electric power apparatus, a distributed electric power storage apparatus, and a hybrid electric vehicle which mount such storage battery apparatus.

Background Art

Because of the gas emission regulation and improvement of fuel consumption, a hybrid electric vehicle has been actively developed which uses a secondary battery as an auxiliary assist power for an engine. A lithium secondary battery and a nickel-hydrogen battery have been often used as this secondary battery for a vehicle. A secondary battery used as a battery of a hybrid electric vehicle is used for assist of an engine (assist in case of acceleration), and supplies electric power to a motor in case that the vehicle is driven only with the motor on a flat road as suspending the engine. Thus, because large electric power is supplied to the motor, the supply to the motor reduces the electric power of this secondary battery, so that the electric power is generated by using a motor for the driving to charge the secondary battery as is necessary.

As described above, a secondary battery used for a battery of a hybrid electric vehicle frequently repeats charging and discharging, the calorific value of the charging and discharging of this secondary battery is large, and the battery performance is temperature-dependent, so that it is necessary to increase the cooling-performance of the battery in consideration of the life of the battery. Up to now, there have been many proposals for increasing such cooling-performance of a battery.

Figure 9:
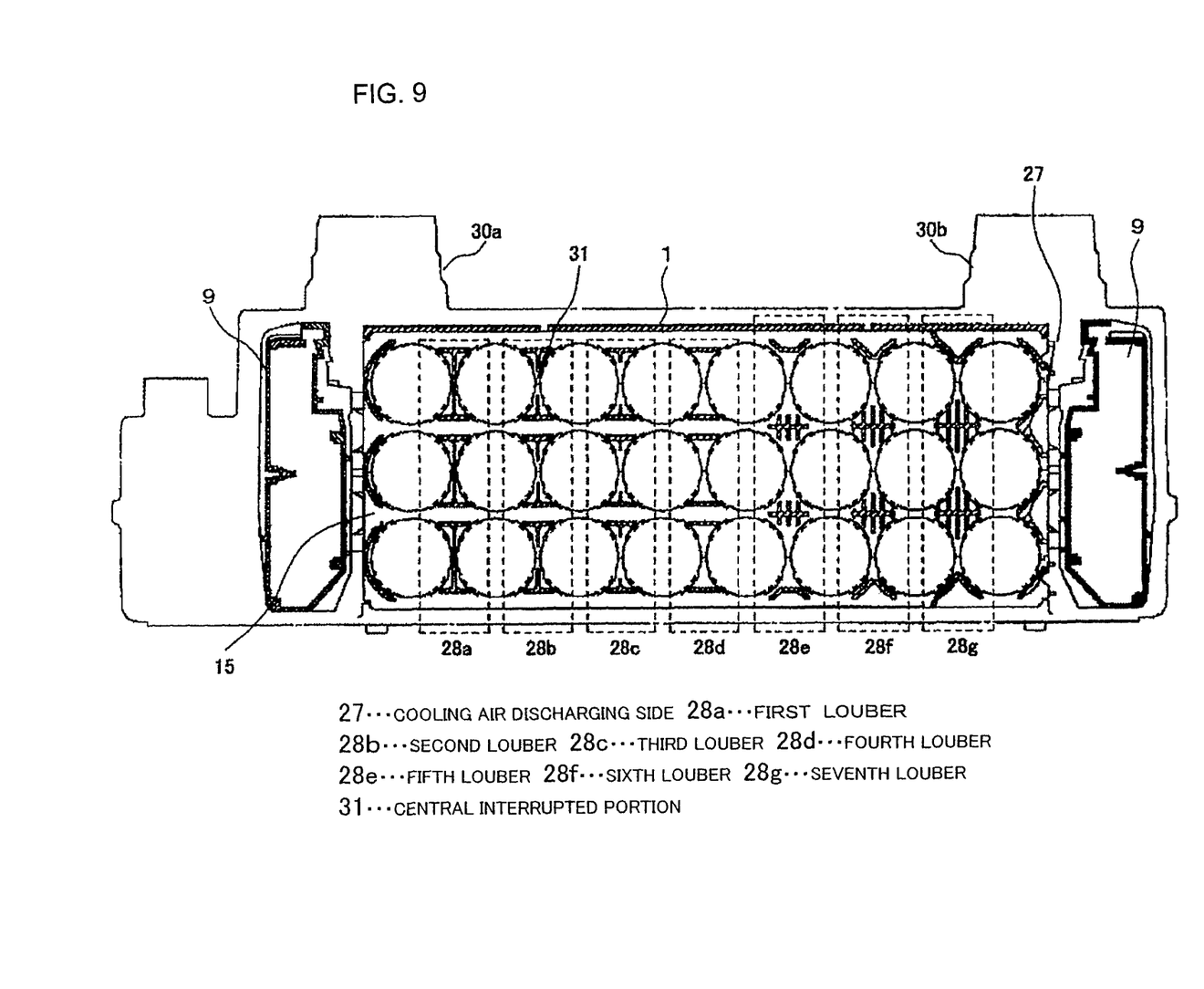
FIG. 9 is a diagram illustrating a conventional cooling structure of a battery.

Thus, as illustrated in FIG. 9, the Patent Document 1 (JP Patent Publication (Kokai) No. 2001-155789) discloses a storage battery apparatus which conventionally changes shapes of assistant ribs forming the first to the seventh louver 28a to 28g to narrow flow paths of cooling air to increase the flow speed of the cooling air as it approaches a cooling air discharging side 27, eliminates the temperature variation between tandem cells, causes the cooling air to join directly from bypaths to the air whose temperature has risen as flowing between the tandem cells to suppress the temperature rise of the tandem cells around the cooling air discharging side 27, and equally cools the whole tandem cells.

In addition, the Patent Document 2 (JP Patent Publication (Kokai) No. 2003-109637) discloses a technique which detects the temperature difference of cooling medium at an entry and an exit of a fuel cell module, and when it exceeds a prescribed value, determines the status of a fuel cell system and a cooling system. However, even if the temperature difference of cooling medium at an entry and an exit of a fuel cell module is detected, it is not enough for deciding the status of the cooling system, and it is not possible to determine the status of a temperature detection unit.

An object of the present invention is to provide a storage battery apparatus including a highly reliable cooling system which can diagnose the status of a cooling unit and a temperature detection unit.

SUMMARY OF THE INVENTION

To achieve the above object, a storage battery apparatus according to the present invention is a storage battery apparatus including a battery module including one or more batteries, plural temperature detection units, a control unit, and a cooling unit which introduces cooling medium to the battery module and cools the batteries, and the temperature detection unit is a temperature detection unit measuring, at least, the temperature of a cooling medium inputting to the storage battery apparatus and the temperature of a cooling medium outputting from the storage battery apparatus, and the temperature of at least one of the batteries and the battery module.

The control unit diagnoses the status of the temperature detection units and the cooling unit from at least one of the temperature of the battery and the temperature of the battery module, and the temperature of the inputting cooling medium and the temperature of the outputting cooling medium. If the temperature of the battery or the temperature of the battery module is higher than the temperature of the inputting cooling medium, the temperature of the outputting cooling medium also rises. If the temperature of the outputting cooling medium is equal to the temperature of the inputting cooling medium, and if the cooling unit is operating, the cooling unit can be diagnosed as abnormal, or if the cooling unit is not operating, the cooling unit can be diagnosed as normal. Moreover, the temperature of the outputting cooling medium is lower than the temperature of the inputting cooling medium, the temperature detection units can be diagnosed as abnormal.

It is also possible to similarly diagnose by providing a voltage detection unit detecting voltage of the battery module or a current detection unit detecting current of the battery module. That is, the operation status of the battery is determined from the value of the voltage detection unit or the current detection unit, and the status of the temperature detection units or the cooling unit is diagnosed from the operation status of the battery and the temperature of the inputting cooling medium and the temperature of the outputting cooling medium.

When the battery module includes plural batteries, the temperature detection units are also disposed at the plural batteries. If there are some variations between the values detected by the temperature detection units disposed at the plural batteries, and also the difference of the variations exceeds a certain threshold, the cooling unit is caused to operate. Thereby, the temperatures of the plural batteries are equalized, so that the accuracy of the present invention is improved.

When an input and output control apparatus is provided which limits input and output of the battery module, and the control unit diagnoses the abnormality of the temperature detection units or the cooling unit, the input and output control apparatus limits the input and output of the battery module to such a value that it can be safely used even if the cooling unit does not operate. Thereby, a highly reliable storage battery apparatus can be realized which can operate an electric power apparatus even if the abnormality is detected.

In addition, when a reporting unit is provided which reports the status of the apparatus, and the control unit diagnoses the abnormality of the temperature detection units or the cooling unit, the reporting unit reports the abnormality. Thereby, operators and service persons can understand the status of the storage battery apparatus.

Similarly, if there are some variations between the values detected by the temperature detection units disposed at the plural batteries, and also the difference of the variations exceeds a certain threshold, the input and output control apparatus limits input and output of the battery module to make it possible to efficiently dissolve the temperature difference of the batteries. In addition, in such a case, the reporting unit can report the abnormality, and operators and service persons can also understand the abnormality.

According to the present invention, it becomes possible to diagnose not only the status of the cooling unit but also the status of the temperature detection unit, and to realize a highly reliable electric power apparatus.

DETAILED DESCRIPTION OF THE PREFERRED EMBODIMENTS

Exemplary embodiments according to the present invention will be described in detail below using the drawings. In the drawings, if there are two or more same components, same code is attached to the same components, and the description will be omitted.

Exemplary Embodiment 1

Figure 1:
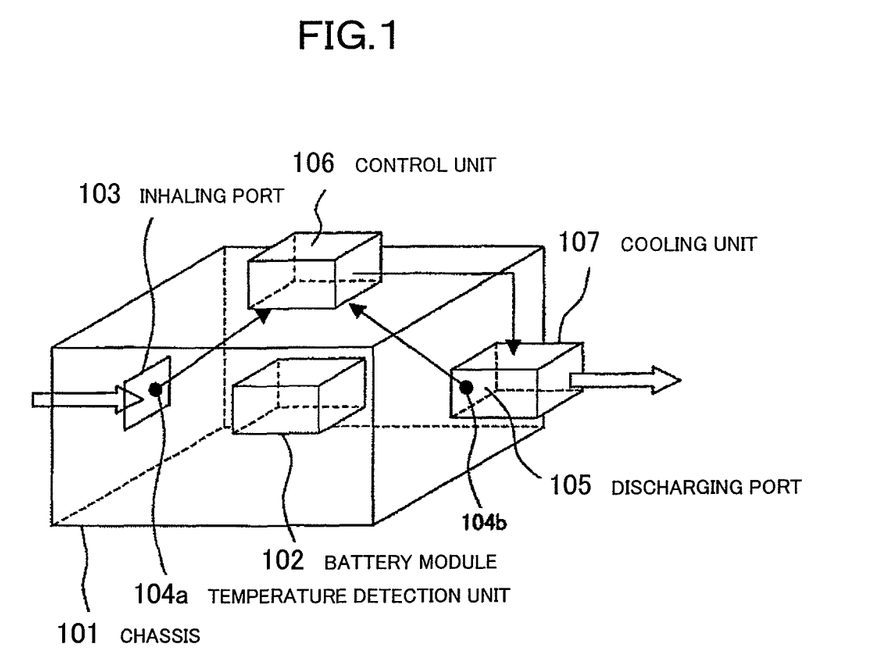
FIG. 1 is a schematic diagram illustrating exemplary embodiment 1 according to the present invention.

FIG. 1 is a diagram illustrating exemplary embodiment 1 according to the present invention. In FIG. 1, reference numeral 101 denotes a chassis, reference numeral 102 denotes a battery module, reference numeral 103 denotes a inhaling port, reference numerals 104a and 104b designate temperature detection units, reference numeral 105 denotes a discharging port, reference numeral 106 denotes a control unit, and reference numeral 107 denotes a cooling unit.

The chassis 101 encloses the battery module 102. The inhaling port 103 and the discharging port 105 are disposed on this chassis 101, and the temperature detection units 104a and 104b are disposed around the inhaling port 103 and the discharging port 105. The cooling unit 107 is disposed at the discharging port 105. The temperature detection units 104a, 104b, and the cooling unit 107 are electrically connected to the control unit 106.

The battery module 102 is configured to connect one or plural batteries such as a lithium secondary battery, a nickel-hydrogen battery, a lead battery, and an electric double layer capacitor, and accumulates (charge) and supplies (discharge) electric energy. The battery module 102 produces heat with the charging and discharging.

The temperature detection units 104a and 104b are configured with thermistors, thermocouples, etc., and convert temperature to electric signal.

The control unit 106 includes electronic parts such as a microcomputer, executes ON, OFF control of the cooling unit 107, and detects temperature from electric signal of the temperature detection units 104a and 104b.

The cooling unit 107 includes a fan and a pump, causes gas such as air and inert gas, or liquid such as water and oil to input or output, and cools the battery module 102.

The battery module 102 produces heat with the charging and discharging, so that if the cooling unit 107 operates, difference is induced between the value detected by the temperature detection unit 104a disposed around the inhaling port 103 and the value detected by the temperature detection unit 104b disposed around the discharging port 105. That is, the temperature detected by the temperature detection unit 104b becomes higher.

Thus, the control unit 106 can diagnose that it is normal if the value of the temperature detection unit 104b is higher than the value of the temperature detection unit 104a while the cooling unit 107 is operating; otherwise, the temperature detection unit 104a or 104b, the cooling unit 107, or the control unit 106 is abnormal, or the inhaling port 103 or the discharging port 105 is closed and the cooling medium is prevented from inputting or outputting.

That is, according to the present invention, by comparing temperatures of inputting cooling medium and outputting cooling medium, it becomes possible to diagnose the status of configuration components of a storage battery apparatus, and realize a highly reliable storage battery apparatus.

In addition, if the battery module 102 is also provided with a temperature detection unit, and the status of the storage battery apparatus is diagnosed from the temperatures of the inhaling port 103, the discharging port 105, and the battery module 102, the diagnosis can be ensured. That is, the temperature of the battery module 102 clearly indicates whether the temperature of the temperature detection unit 104b should be higher than that of the temperature detection unit 104a, allowing the diagnosis to be ensured.

Exemplary Embodiment 2

Figure 2:
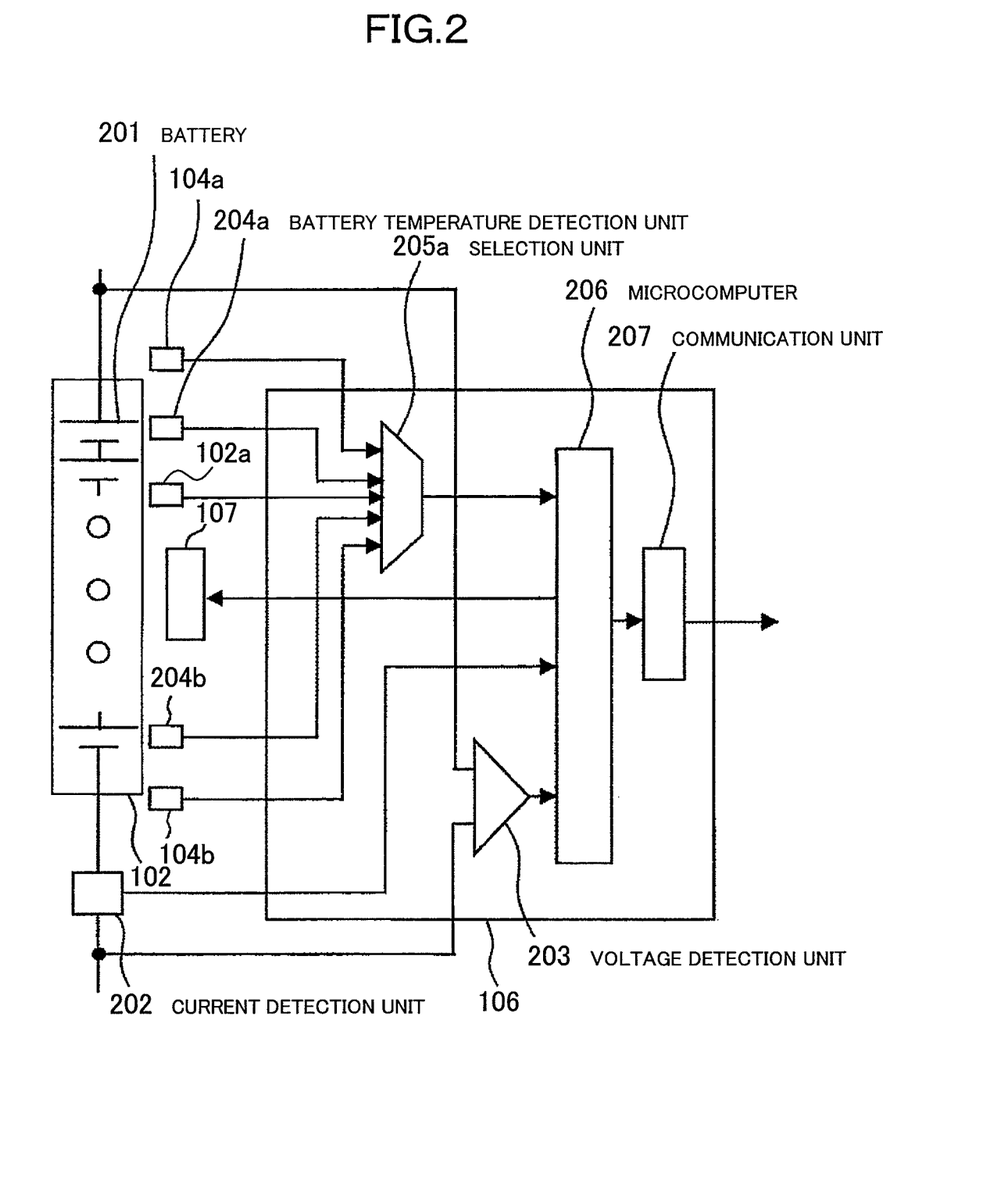
FIG. 2 is a diagram illustrating exemplary embodiment 2 according to the present invention.

FIG. 2 is a diagram illustrating exemplary embodiment 2 according to the present invention. In FIG. 2, reference numeral 201 denotes a battery, reference numeral 202 denotes a current detection unit, reference numeral 203 denotes a voltage detection unit, reference numerals 104a, 104b (inhaling/discharging temperature of cooling medium), 102a (temperature of battery module), and 204a, 204b (temperature of battery) denote temperature detection units, reference numeral 205 denotes a selection unit, reference numeral 206 denotes a microcomputer, and reference numeral 207 denotes a communication unit.

Plural batteries 201 are connected in series, and configure a battery module. Moreover, the control unit 106 is configured with the voltage detection unit 203, the selection unit 205, the microcomputer 206, and the communication unit 207.

The current detection unit 202 is disposed at the battery module 102, and its output is inputted to the microcomputer 206. In addition, the voltage detection unit 203 is connected to both terminals of the battery module 102, and the output of the voltage detection unit 203 is inputted to the microcomputer 206. Further, the temperature detection units 204a and 204b are disposed at the batteries 201, and the outputs of plural temperature detection units, that is, the temperature detection units 104a and 104b detecting the temperature of cooling medium at a inhaling port or a discharging port, and at least one of 204a and 204b detecting the temperature of the battery or 102a detecting the temperature of the battery module are inputted to the microcomputer 206 through the selection unit 205. The microcomputer 206 is also connected to the cooling unit 107 and the communication unit 207.

The current detection unit 202 is configured with a circuit which converts a voltage produced at both terminals of a current sensor or a shunt register to a current value, and detects current flowing in the battery module 102. Here, while the current detection unit 202 is disposed outside the control unit 106, a part or the whole of the current detection unit 202 may be also configured in the control unit 106.

The voltage detection unit 203 is configured with circuits such as voltage dividing registers and operational amplifiers, and converts the voltage of the battery module 102 to a value which can be inputted to the microcomputer 206.

The temperature detection units 204a and 204b are configured with a thermistor, a thermocouple, etc. and converts temperature to electric signal. Moreover, when there are plural batteries, the temperature of each battery is averaged (averaged temperature of a battery) to be used for calculation.

The selection unit 205 includes a multiplexer, etc., selects one of outputs of the temperature detection units 104a and 104b, and at least one of 204b or 102a, and inputs it to the microcomputer 206. A selection of plural temperature detection units 104a, 104b, 204a, 204b, and 102a is appropriately executed by switching them.

An analog digital conversion circuit is also included in the microcomputer 206, and converts outputted values of the current detection unit 202, the voltage detection unit 203, and the temperature detection units 104a, 104b, 204a, 204b, or 102a to digital values to calculate the status of the battery module 102. Then, based on the calculation result, the ON and OFF control of the cooling unit 107 and the communication with another microcomputer and controller through the communication unit 207 are executed.

Here, while the analog digital conversion circuit is disposed in the microcomputer 206, it may be also disposed outside the microcomputer 206, or the current detection unit 202, the voltage detection unit 203, the inhaling discharging temperature detection units 104a, 104b, 204a, 204b, and 102a which include analog digital conversion circuits may be used.

The communication unit 207 includes CAN (Controller Area Network) IC, RS232C driver IC, etc. and performs the conversion to generate a signal which is suitable to a variety of communication protocols.

The microcomputer 206 calculates the status of the battery module 102, and concurrently also controls the cooling unit 107, so that it can diagnose the abnormality of the cooling unit 107, or the temperature detection unit 104a, 104b, etc. from the operation status of the battery module 102, and the values of the temperature detection units 104a, 104b, and 204a, 204b, or 102a.

For example, if the battery module 102 is charged or discharged with more current than a certain current value, the produced heat is increased. This is confirmed with the temperature detection unit 204a, 204b or 102a which are disposed at the batteries 201. Further, if the battery module 102 is charged or discharged, the voltage of the battery module 102 varies. This is confirmed with the voltage detection unit 203. Then the operation status and the produced heat of the battery module 102 are confirmed with such confirmations. At this time, it can be diagnosed that it is normal if the value of the temperature detection unit 104b is higher than the value of the temperature detection unit 104a; otherwise, the inhaling discharging temperature detection unit 104a or 104b, the cooling unit 107, or the control unit 106 is abnormal, or the inhaling port 103 or the discharging port 105 is closed and the cooling medium is prevented from inputting or outputting.

Figure 3:
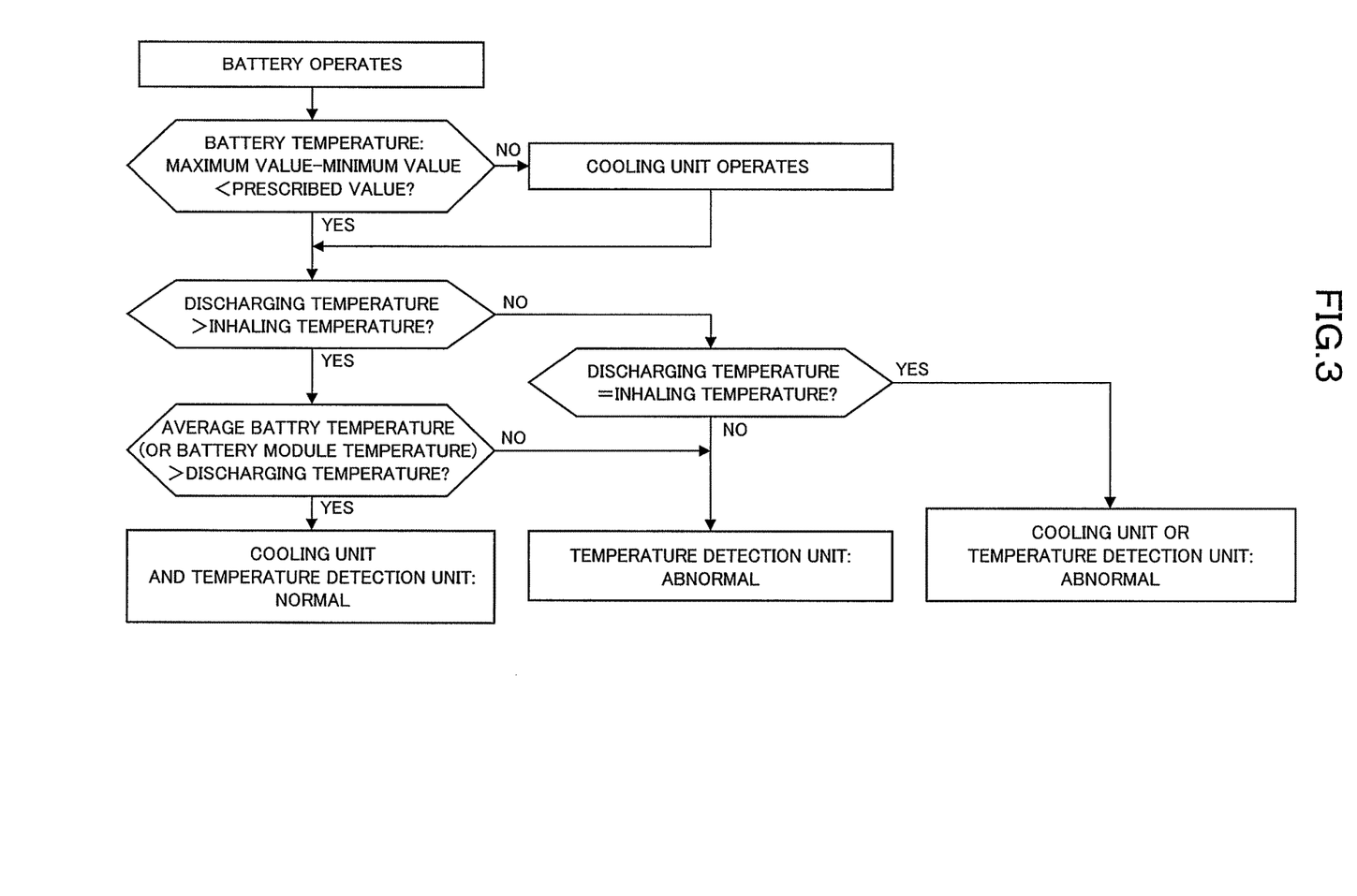
FIG. 3 is a flow chart diagram illustrating the exemplary embodiment 2 according to the present invention.

As an actual example, an exemplary embodiment according to the present invention will be described below. FIG. 3 illustrates a flowchart of the below exemplary embodiment.

The battery module 102 is operating and producing heat, and the temperature of the battery or the temperature of the battery module is higher than the inhaling temperature. Such relations are confirmed by the control unit 106 and determined that the operation status of the battery module 102 is correct. If there are some variations between the temperatures of each battery, ON signal is inputted to the cooling unit 107, and the cooling unit 107 starts operating, so that the temperature of each battery becomes equal.

In this case, when the cooling unit is operating, the heat of the battery is conducted to the cooling medium, and the discharging temperature becomes higher than the inhaling temperature. However, because 100% of the heat of the battery cannot be conducted to the cooling medium, if the discharging temperature becomes lower than the temperature of the battery, the cooling unit and the temperature detection units are normal.

If the discharging temperature is detected to be farther higher than the battery temperature, it can be diagnosed that the discharging temperature detection unit 104b is abnormal.

If the discharging temperature is also detected to be lower than the inhaling temperature, it can be diagnosed that the temperature detection unit disposed at the inhaling port or the discharging port is abnormal.

If the inhaling temperature is detected to be equal to the discharging temperature, because the cooling unit is actually operating, it is estimated that the cooling unit or the temperature detection unit is abnormal.

Moreover, if the cooling unit is not operating, because the heat is not conducted, even if the inhaling temperature is detected to be equal to the discharging temperature, it can be diagnosed that it is normal.

As described above, according to the resent invention, it is possible to diagnose the abnormality of the cooling unit 107 or the temperature detection unit 104a, 104b, etc. from the operation status of the battery module 102, and the values of the temperature detection units 104a, 104b, and at least one of 204a, 204b, or 102a, and to provide a storage battery apparatus including a highly reliable cooling system.

Figure 4:
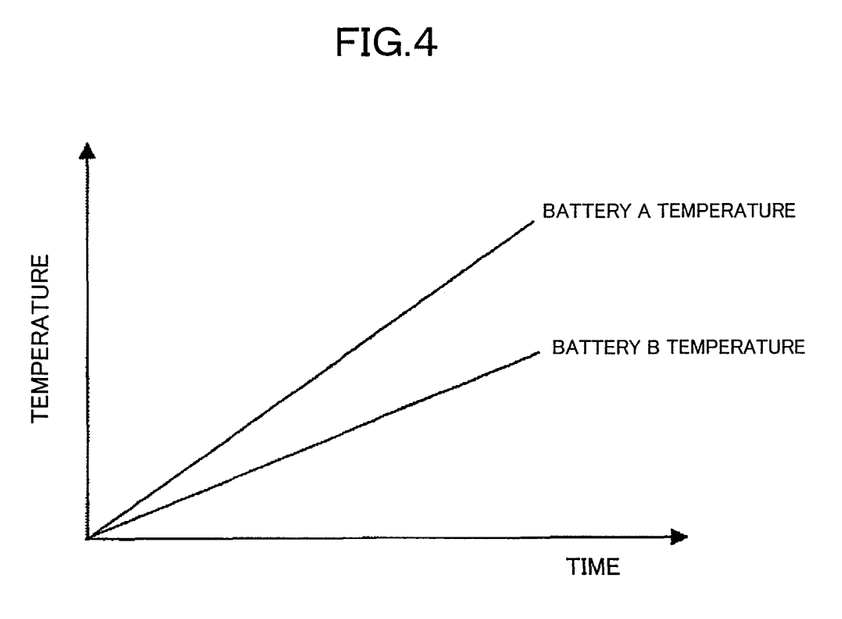
FIG. 4 is a diagram illustrating the temperature of each battery when a battery module of the exemplary embodiment 2 is charged and discharged.

FIG. 4 is a diagram illustrating the temperature of each battery when a battery module is charged and discharged. The battery produces heat because of the charging and discharging, and the temperature rises as time advances.

Thus, the control unit 106 measures the temperatures of the batteries 201 through the battery temperature detection units 204a and 204b, and if it becomes more than a certain temperature, causes the cooling unit 107 to operate to prevent the temperatures of the batteries 201 from rising. Moreover, if the temperatures of the batteries 201 become less than a certain temperature, the cooling unit 107 is caused to stop.

Figure 5:
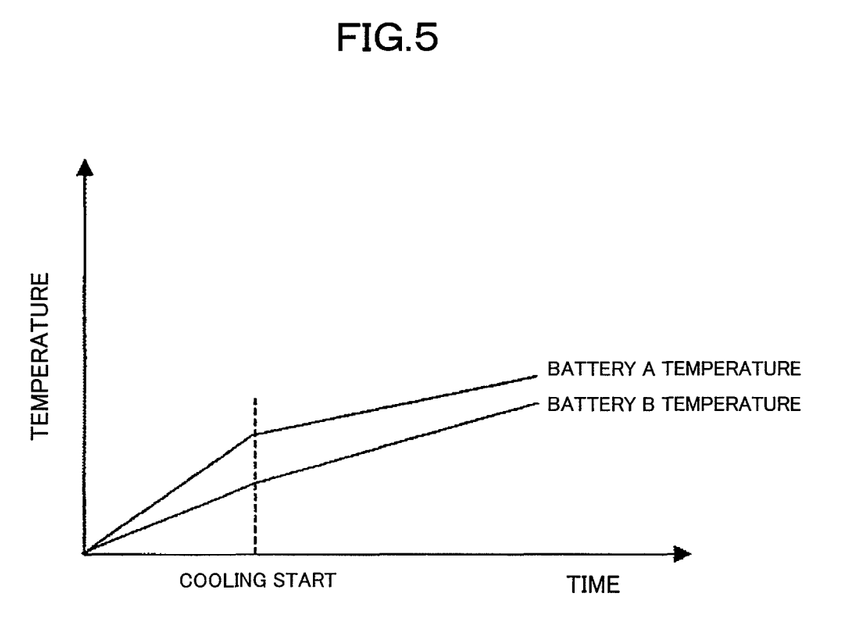
FIG. 5 is a diagram illustrating the temperature of each battery when a battery module of the exemplary embodiment 2 is cooled.

The variations of the temperatures of the batteries 201 are induced because of the charging, discharging, etc. Thus, the control unit 106 calculates the temperature difference between the temperature detection units 204a and 204b, and also if the difference exceeds a prescribed value, causes the cooling unit 107 to operate. Thereby, as illustrated in FIG. 5, the temperature difference of each battery 201 is improved. For example, the highest battery temperature and the lowest battery temperature are detected, and if the temperature difference between such temperatures exceeds a certain threshold, a cooling fan can be caused to operate.

In the batteries 201, because the characteristic of input and output, the characteristic of heating, the degradation rate, etc. vary according to the temperature, it is important for an electric power apparatus to use each battery at an equalized temperature.

As described above, according to the present invention, it is possible to provide a storage battery apparatus including a highly reliable cooling system by diagnosing the abnormality of the cooling unit 107 or the temperature detection units 104a, 104b, etc. from the operation status of the battery module 102, and the values of the temperature detection units 104a and 104b, and at least one of 204a, 204b, or 102a, and appropriately cooling each battery 201 from the values of the temperature detection unit 204a and 204b.

A lithium secondary battery can be used as a secondary battery used for the present invention. In a lithium secondary battery, a positive electrode which can occlude and release lithium and a negative electrode which can occlude and release lithium are formed through electrolyte, and for example, it may be a cylinder-type lithium secondary battery illustrated in FIG. 6.

A positive electrode is formed by applying positive electrode combination agent including positive electrode active material, electrical conducting material, combining material, etc. to positive electrode collector.

As positive electrode active material, lithium composite oxide can be used which is represented by $Li_{1+\alpha}Mn_xM1_yM2_zO_2$ (M1: at least one kind selected from Co and Ni, M2: at least one kind selected from Co, Ni, Al, B, Fe, Mg, and Cr, $x+y+z=1$, $0.2 \leq x \leq 0.6$, $0.1 \leq y \leq 0.5$, $0.05 \leq z \leq 0.5$, $0.01 \leq \alpha \leq 0.3$). For example, $Li_{1.15}Mn_4Ni_3Co_2O_2$, $Li_{1.15}Mn_{1/3}Ni_{1/3}Co_{1/3}O_2$, $Li_{1.15}Mn_3Ni_4Co_3O_2$, $Li_{1.15}Mn_{3.5}Ni_3Co_3Al_{0.5}O_2$, $Li_{1.15}Mn_{3.5}Ni_3B_{0.5}O_2$, $Li_{1.15}Mn_{3.5}Ni_3Co_3Fe_{0.5}O_2$, $Li_{1.15}Mn_{3.5}Ni_3Co_3Mg_{0.5}O_2$, $LiMn_4Ni_3Co_2O_2$, $LiMn_{1/3}Ni_{1/3}Co_{1/3}O_2$, $LiMn_3Ni_4Co_3O_2$, $LiMn_{3.5}Ni_3Co_3Al_{0.5}O_2$, $LiMn_{3.5}Ni_3Co_3B_{0.5}O_2$, $LiMn_{3.5}Ni_3Co_3Fe_{0.5}O_2$, and $LiMn_{3.5}Ni_3Co_3Mg_{0.5}O_2$ can be used particularly, lithium composite oxide is preferable which is represented by $Li_{1+\alpha}Mn_xNi_yCo_zO_2$ ($x+y+z=1$, $0<x \leq 1$, $0<y \leq 1$, $0<z \leq 1$, $0.01 \leq \alpha \leq 0.3$), and also $Li_{1+\alpha}Mn_xNi_yCo_zO_2$ ($x+y+z=1$, $0.2 \leq x \leq 0.6$, $0.1 \leq y \leq 0.5$, $0.05 \leq z \leq 0.5$, $0.01 \leq \alpha \leq 0.3$) is further preferable. The low temperature characteristic and the cycle stability of $Li_{1.15}Mn_{1/3}Ni_{1/3}Co_{1/3}O_2$ used in the exemplary embodiment of the present invention are high, and it is most suitable for material of HEV device.

A negative electrode is formed by applying negative electrode combination agent including negative electrode active material, electrical conducting material, combining material, etc. to negative electrode collector.

Natural graphite, composite carbonic material whose coat is formed on natural graphite by dry-type CVD (Chemical Vapor Deposition) method or wet-type spray method, carbonic material such as artificial graphite and amorphous carbonic material which are produced by baking resin material such as epoxy and phenol, or pitch material obtained from oil and coal, lithium metal which can occlude and release lithium by forming compound with lithium, or oxide or nitride of IV group element such as silicon, germanium, and tin which can occlude and release lithium by forming compound with lithium, or as inserted between a space crystals can be used as negative electrode active material. For example, $SiO_2$, $TiO_2$, or $SiN_2$ are included. Particularly, with regard to carbonic material, the conductivity is high, and the low temperature characteristic, and cycle stability are excellent. Among carbonic materials, material whose carbon net face layer distance ($d_{002}$) is wide is excellent in quick charging and discharging and the low temperature characteristic, and suitable as material of the present invention. However, with regard to material whose carbon net face layer distance ($d_{002}$) is wide, capacity may decreases in the beginning of the charging, and efficiency of the charging and discharging may be low, so that it is desirable that $d_{002}$ is not more than 0.39 nm. Further, in order to form an electrode, it is better to mix carbonic material whose conductivity is high such as graphite, amorphous, and activated carbon.

Main component of electrolyte may be straight-chain or circular carbonate. Ester, ether, and etc. may be also mixed in the electrolyte. For example, ethylene carbonate (EC), propylene carbonate, butylene carbonate, dimethyl carbonate (DMC), diethyl carbonate (DEC), methyl-ethyl carbonate, diethyl carbonate, methyl-acetate, etc. may be included as carbonate. Non-aqueous solution made of such single or mixed components may be used.

Figure 6:
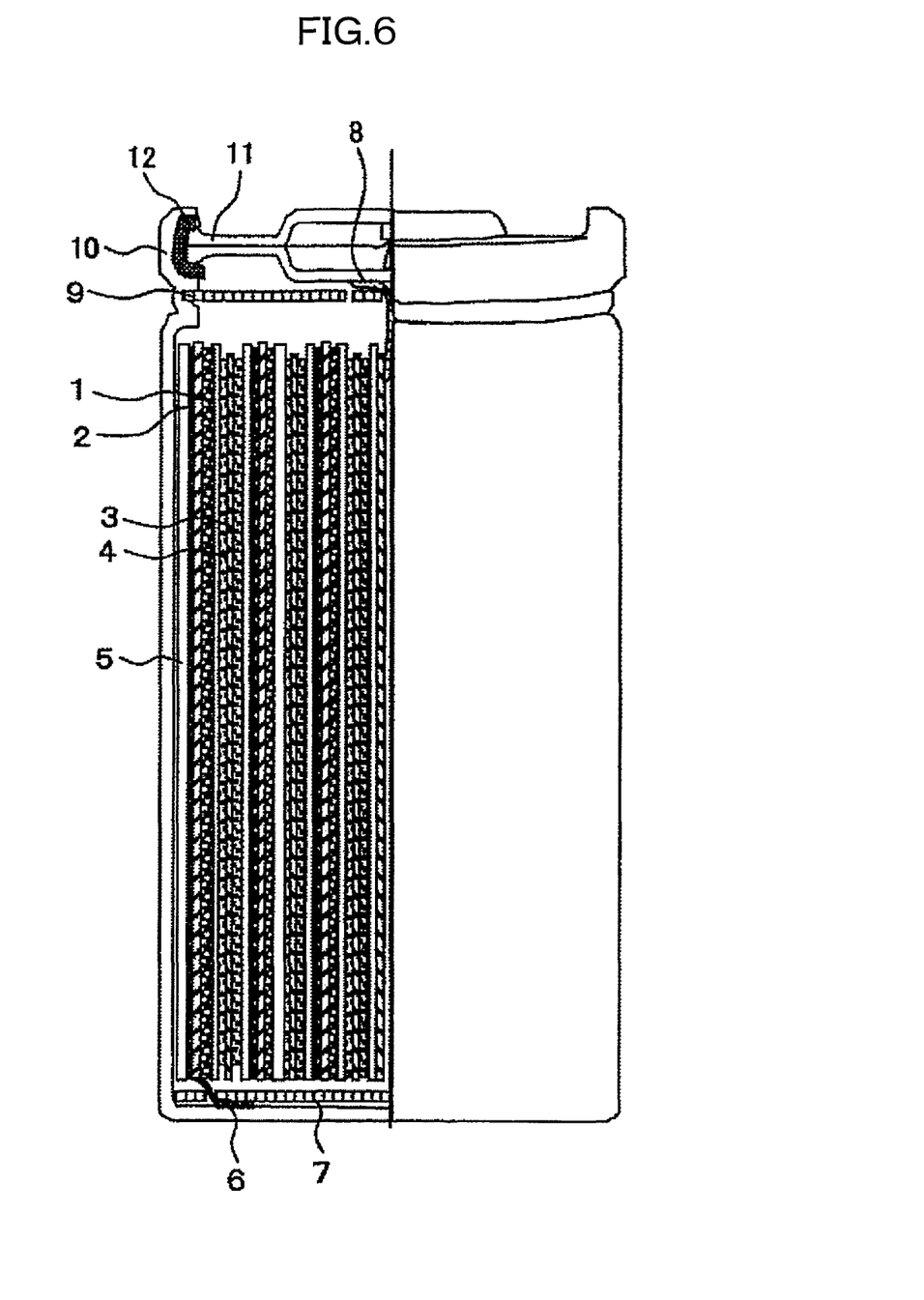
FIG. 6 is a partial cross-section view of a lithium secondary battery used for the present invention.

FIG. 6 is a partial cross-section view of a cylinder-type lithium secondary battery produced using produced positive electrode plates and negative electrode plates. The cylinder-type lithium secondary battery is produced according to the following procedure. First, electrode group is produced by allocating separators 6 between a positive electrode plate 4 and a negative electrode plate 5 so that the positive electrode plate 4 and the negative electrode plate 5 do not directly contact, and winding the positive electrode plate 4 and negative electrode plate 5. A positive electrode piece 7 and a negative electrode piece 8 are positioned each other at both opposite edge faces of an electrode group. The positive electrode plate 4 and the negative electrode plate 5 are disposed so that a combination agent application part of a positive electrode does not get out from a combination agent application part of a negative electrode. Next, the electrode group is inserted to a SUS battery can 9, the negative electrode piece 8 is welded to a can bottom, and the positive electrode piece 7 is welded to a sealing cap 10 which doubles as a positive electrode current terminal. After electrolyte is inputted to the battery can 9 in which such electrode group is disposed, packing 11 is attached to an upper side and a bottom side respectively, the battery can 9 is caulked with the sealing cap 10 to be sealed, and a cylinder-type battery is completed. Here, the sealing cap 10 includes a cleavage valve which cleavages to discharge the pressure in the battery if the pressure increases in the battery, and reference numeral 12 denotes an insulating material.

Exemplary Embodiment 3

Figure 7:
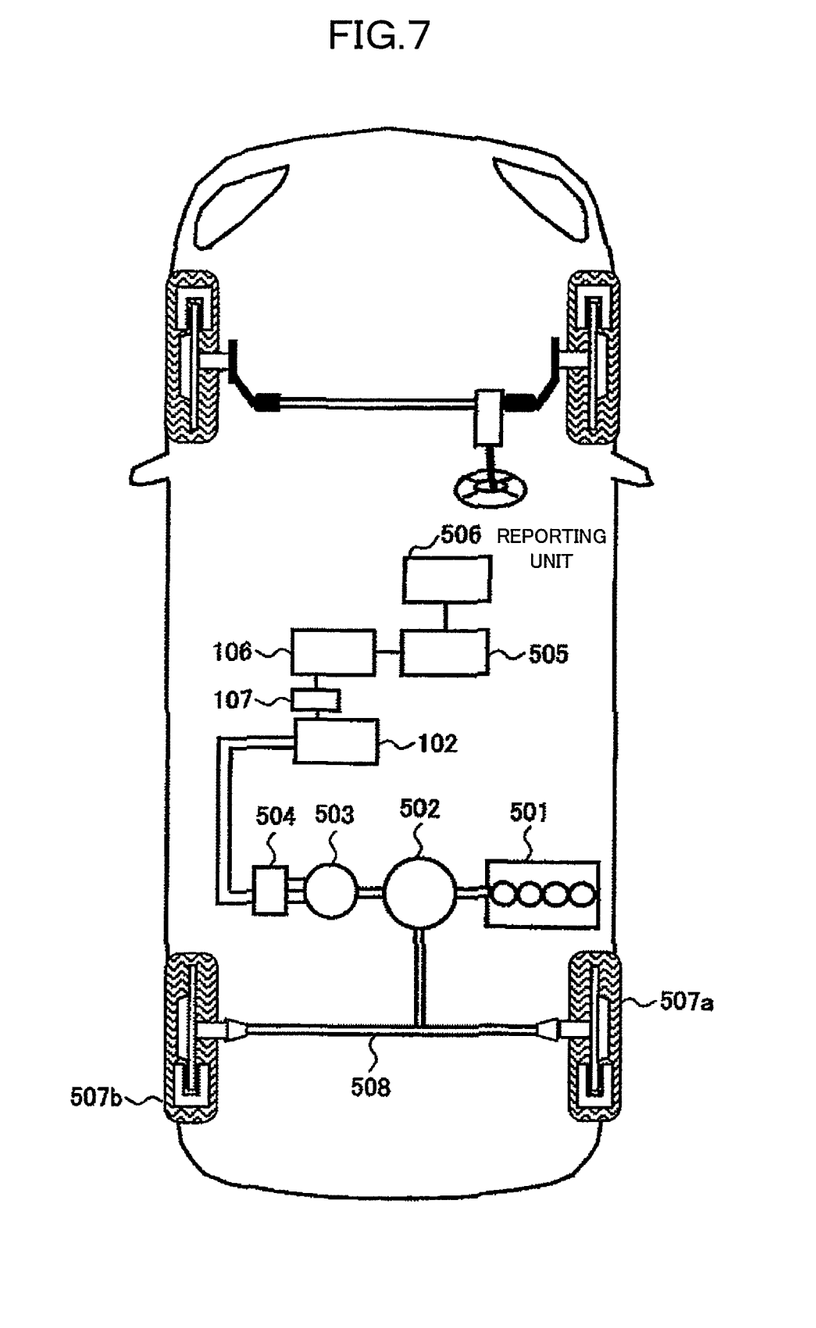
FIG. 7 is a diagram illustrating exemplary embodiment 3 according to the present invention.

FIG. 7 is a diagram illustrating exemplary embodiment 3 according to the present invention, and illustrating an exemplary embodiment of an electric power supply for a hybrid electric vehicle to which an exemplary embodiment of an electric power apparatus according to the present invention is applied. In FIG. 7, reference numeral 501 denotes an engine, reference numeral 502 denotes a power dividing transmission mechanism, reference numeral 503 denotes a motor, reference numeral 504 denotes an inverter, reference numeral 505 denotes a system controller, reference numeral 506 denotes a reporting unit, reference numerals 507a and 507b denote driving wheels, and reference numeral 508 denotes a drive shaft.

The engine 501 is connected with the motor 503, and the driving wheels 507a and 507b through the power dividing transmission mechanism 502 and the drive shaft 508, and so-called a parallel hybrid electric vehicle is configured in which the driving wheels 507a and 507b are driven by the motor 503 and the engine 501.

The distribution and transmission of driving force are performed in such a manner that the power dividing transmission mechanism 502 mechanically connects and disconnects the engine 501 and the motor 503 to drive the drive shaft 508.

Here, the battery module 102 is connected to the motor 503 through the inverter 504, and supplies (discharge) electric power to the motor 503 and accumulates (charge) regenerated electric power from the motor 503.

The control unit 106 is connected with the system controller 505, and the system controller 505 is also connected with the reporting unit 506.

The system controller 505 controls the distribution and transmission of driving force, and the charging and discharging of the battery module 102. The system controller 505 is also connected to a controller (not shown) of the inverter 504 and a controller (not shown) of the engine 501, controls the whole hybrid electric vehicle, and reports the status of various components with the reporting unit 506.

Here, the reporting unit 506 is configured with a display apparatus, a voice generation apparatus, a vibration apparatus, etc., and reports information with image, voice, etc.

According to the present invention, if the control unit 106 diagnoses the abnormality of the cooling unit 107, the temperature detection units 104a, 104b, or etc., the control unit 106 transfers the information to the system controller 505 through the communication unit 207.

The system controller 505 receives the information and transmits an instruction for limiting input and output of the battery module 102 to the controller of the inverter 504. Then, the inverter 504 controls the battery module 102 to be within such an electric power for the charging and discharging that the battery module 102 can be safely used even if the cooling unit 107 does not operates. That is, the inverter 504 also functions as an input and output control apparatus of the battery module 102.

Thereby, even if the cooling unit 107, the temperature detection units 104a, 104b, etc. becomes abnormal, it is possible to safely control the electric power apparatus and the whole hybrid electric vehicle.

According to the present invention, if the control unit 106 diagnoses the abnormality of the cooling unit 107, the temperature detection units 104a, 104b, etc., the control unit 106 transmits the information to the system controller 505 through the communication unit 207, and the system controller 505 reports the information to a driver through the reporting unit 506. Thereby, the driver is able to understand the abnormality of the cooling unit 107, the temperature detection units 104a, 104b, etc., and is able to perform appropriate solution.

Similarly, if the control unit 106 diagnoses that the difference of the values detected by the temperature detection units 204a and 204b has exceeded a threshold, the control unit 106 causes the cooling unit 107 to operate, and transmits the information to the system controller 505 through the communication unit 207.

The system controller 505 receives the information and transmits an instruction for limiting input and output of the battery module 102 to the controller of the inverter 504. Then, the inverter 504 limits the electric power for the charging and discharging of the battery module 102 so that the temperature difference does not increase. Thereby, even if the temperature difference of the batteries 201 is induced, it is possible to reduce the temperature difference, and also to safely control the electric power apparatus and the whole hybrid electric vehicle.

In addition, the system controller 505 reports the information to the driver through the reporting unit 506. Thereby, the driver is able to understand the abnormality of the cooling unit 107, the temperature detection units 104a, 104b, etc., and is able to perform appropriate solution.

Exemplary Embodiment 4

Figure 8:
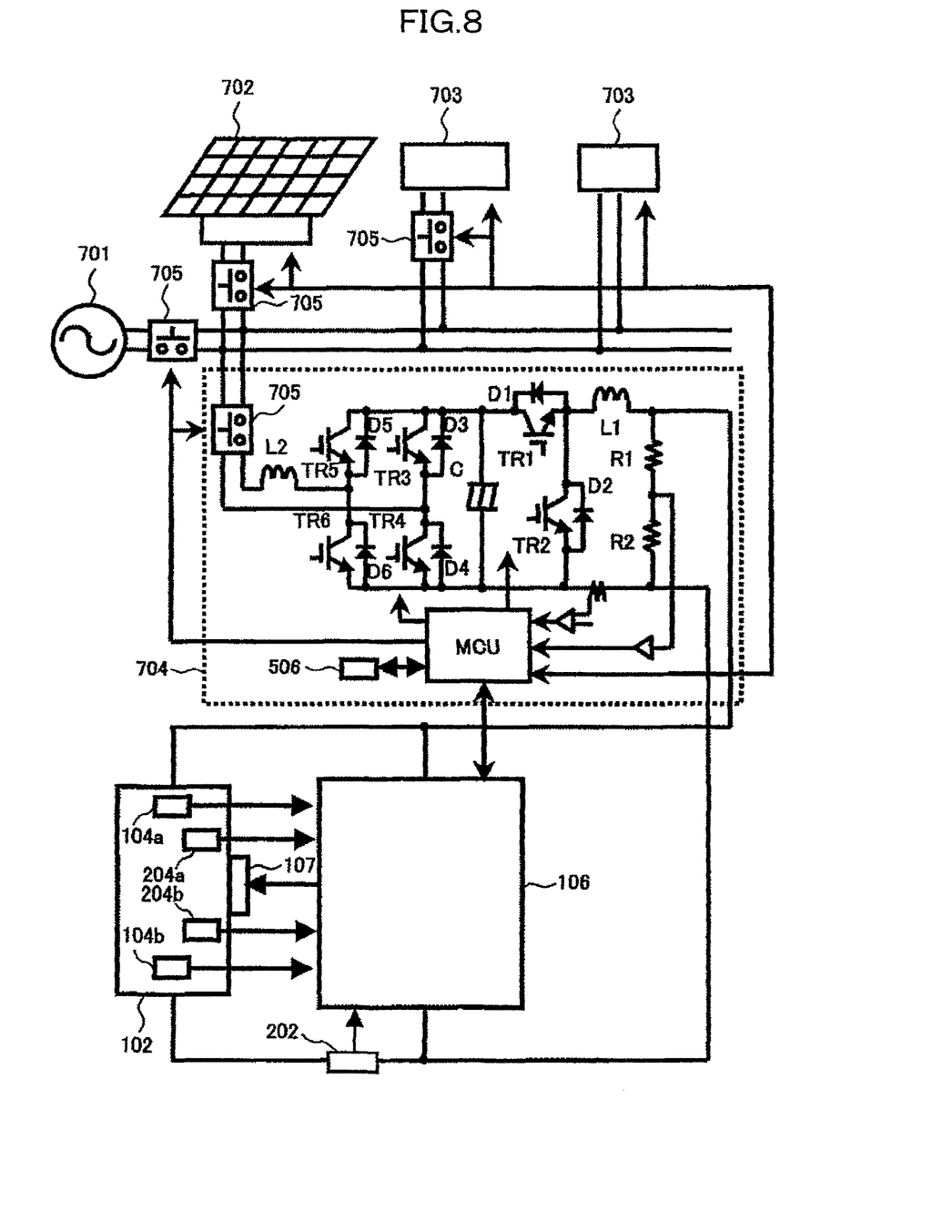
FIG. 8 is a diagram illustrating exemplary embodiment 4 according to the present invention.

FIG. 8 is a diagram illustrating exemplary embodiment 4 according to the present invention, and illustrating an exemplary embodiment of a distributed electric power storage apparatus to which an exemplary embodiment of an electric power apparatus according to the present invention is applied. In FIG. 8, reference numeral 701 denotes a commercial electric power source, reference numeral 702 denotes a photovoltaic power generation apparatus, reference numeral 703 denotes a load apparatus, reference numeral 704 denotes a control converter, and reference numeral 705 denotes a switcher.

Both terminals of the battery module 102 are connected to the control converter 704, the control converter 704 are further connected to the commercial electric power source 701, the photovoltaic power generation apparatus 702, and the load apparatus 703 through the switchers 705 respectively.

The photovoltaic power generation apparatus 702, the load apparatus 703, MCU of the control converter 704, the switchers 705, and the control unit 106 are connected by bidirectional communication.

The photovoltaic power generation apparatus 702 converts sun light to direct current electric power with solar cells, and outputs alternating current electric power with an inverter apparatus.

The load apparatus 703 refers to home appliances such as an air conditioner, a refrigerator, a kitchen microwave, and an illuminator, electric equipments such as a motor, an elevator, a computer, and a medical equipment, and the second electric power source apparatus. The control converter 704 is a charger-discharger which converts alternating current electric power to direct current electric power, or direct current electric power to alternating current electric power. Moreover, the control converter 704 doubles as a controller which controls the charging and discharging, and equipment such as the above photovoltaic power generation apparatus 702, load apparatus 703, etc.

Here, such equipment may internally include the switchers 705. It is also possible to adopt other connection embodiment than the configuration illustrated in FIG. 8 as the electric power source apparatus according to the present invention. According to the exemplary embodiment 4, when the commercial electric power source 701 or the photovoltaic power generation apparatus 702 can not cover the electric power required by the load apparatus 703, the electric power is supplied from the battery module 102 through the control converter 704, and when the electric power supply from the commercial electric power source 701 or the photovoltaic power generation apparatus 702 is too much, the electric power is accumulated in the battery module 102 through the control converter 704.

In such operations, the control unit 106 diagnoses the temperature detection units 104a, 104b, and the cooling unit 107, and controls the cooling unit 107 according to the present invention, and transmits the information to the control converter 704. The control converter 704 controls the charging and discharging, etc. according to this information.

That is, the control converter 704 controls input and output of the battery module 102 within such an electric power for the charging and discharging that the battery module 102 can be safely used even if the cooling unit 107 does not operates. Thereby, even if the cooling unit 107 or the temperature detection units 104a, 104b, etc. becomes abnormal, the electric power source apparatus can be safely controlled.

According to the present invention, if the control unit 106 diagnoses the abnormality of the cooling unit 107 or the temperature detection units 104a, 104b, etc., the control unit 106 transmits the information to the control converter 704 through the communication unit 207, and the control converter 704 reports to the reporting unit 506, an operator center (not illustrated), etc.

Thereby, operators and workers are able to understand the abnormality of the cooling unit 107 or the temperature detection units 104a, 104b, etc., and able to perform appropriate solution.

Similarly, when the control unit 106 diagnoses that the value (discharging temperature) detected by the temperature detection unit 204b is lower than the value (inhaling temperature) detected by the temperature detection unit 204a, or the difference between the values detected by the temperature detection units 204a and 204b exceeds a threshold, the control unit 106 causes the cooling unit 107 to operate, and transmits the information to the control converter 704 through the communication unit 207.

The control converter 704 receives the information, limits input and output of the battery module 102, and limits the charging and discharging electric power of the battery module 102 so that the temperature difference does not expand. Thereby, even if the temperature difference of the batteries 201 is induced, it is possible to reduce the temperature difference, and also, safely control the electric power source apparatus.

Here, in the exemplary embodiment 4, because the battery module 102 is provided, it becomes possible to decrease the contracted electric power and the electric power consumption of the commercial electric power source 701 and the related power generation of the photovoltaic power generation apparatus 702, and to promote the reduction of the equipment cost and the running cost.

When the electric power consumption is concentrated on a certain time period, the electric power is supplied from the electric power source apparatus to the commercial electric power source 701, and when the electric power consumption is small, the electric power is accumulated in the electric power source apparatus, so that it becomes possible to reduce the concentration of the electric power consumption, and promote the equalization of the electric power consumption.

Further, the control converter 704 monitors the electric power consumption of the load apparatus 703 to control the load apparatus 703, so that the energy saving and the efficient utilization of the electric power can be achieved.

What is claimed is:

1. A storage battery apparatus, comprising:
   a chassis including an inhaling port and a discharging port;
   a battery module that is a structural body constructed by electrically connecting a plurality of batteries, the battery module being arranged in the chassis;
   a fluid device programmed to introduce a cooling medium for cooling the plurality of batteries into the chassis and to discharge the cooling medium, after having cooled the plurality of batteries, from the chassis;
   a plurality of temperature detectors including a first temperature detector programmed to detect the temperature of the cooling medium introduced into the chassis, a second temperature detector programmed to detect the temperature of the cooling medium discharged from the chassis, and a third temperature detector programmed to detect the temperature of at least one of the batteries and the battery module; and
   a control unit programmed to receive electric signals output from the plurality of temperature detectors, the control unit including:
   a temperature detection unit programmed to detect, on the basis of the electric signals output from the plurality of temperature detectors, the temperature of the cooling medium introduced into the chassis, the temperature of the cooling medium discharged from the chassis, and the temperature of at least one of the batteries and the battery module, and
   a fluid-device-operation control unit programmed to control the operation of the fluid device on the basis of the temperatures detected with the temperature detection unit,
   wherein the inhaling port and discharging port are separately disposed on both sides of the battery module,
   wherein the plurality of temperature detectors are disposed at least at the inhaling port and discharging port of the chassis,
   wherein the control unit is programmed to diagnose if the plurality of temperature detectors and the fluid device are abnormal or not on the basis of a comparison between the temperatures detected with the temperature detection unit and the plurality of temperatures including the temperature of the cooling medium introduced into the chassis, the temperature of the cooling medium discharged from the chassis, and the temperature of at least one of the batteries and the battery module, and
   wherein when the fluid device is in operation, the control unit is programmed to diagnose that:
     the plurality of temperature detectors and the fluid device are normal, if the temperature of the cooling medium discharged from the chassis is higher than the temperature of the cooling medium introduced into the chassis, and is lower than the temperature of at least one of the batteries and the battery module;
     the plurality of temperature detectors programmed to detect the temperature of the cooling medium discharged from the chassis is abnormal, if the temperature of the cooling medium discharged from the chassis is higher than the temperature of the cooling medium introduced into the chassis and is also higher than the temperature of at least one of the batteries and the battery module;
     the plurality of temperature detectors programmed to detect the temperature of the cooling medium discharged from the chassis is abnormal, if the temperature of the cooling medium discharged from the chassis is lower than the temperature of the cooling medium introduced into the chassis; and the plurality of temperature detectors or the fluid device is abnormal, if the temperature of the cooling medium discharged from the chassis is equal to the temperature of the cooling medium introduced into the chassis.

2. The storage battery apparatus according to claim 1, further comprising:
a reporting unit reporting abnormality, when the control unit diagnoses the abnormality of the plurality of temperature detectors and the fluid device.

3. The storage battery apparatus according to claim 1, further comprising:
a communication unit transmitting information to a host system,
wherein, when the control unit diagnoses the abnormality of the plurality of temperature detectors and the fluid device, the control unit transmits diagnostic information about the abnormality to the host system, via the communication unit, so as to limit the charging and discharging of the battery module.

4. The storage battery apparatus according to claim 1, wherein the control unit is programmed to detect the temperatures of the batteries included in the battery module from an output signal of the third temperature detector, and causes, if the difference of the temperatures of the batteries exceeds a given threshold, the fluid device to operate.

5. The storage battery apparatus according to claim 1, further comprising:
a communication unit transmitting information to a host system,
wherein the control unit, if the difference of the temperatures of the batteries included in the battery module exceeds the given threshold, transmits information to the host system, via the communication unit, the information indicating that the difference of the temperatures of the batteries included in the battery module has exceeded the given threshold.

6. The storage battery apparatus according to claim 1, further comprising:
a reporting unit reporting abnormality,
wherein if the difference of the temperatures of the batteries included in the battery module exceeds the given threshold, the reporting unit reports the abnormality.

7. The storage battery apparatus according to claim 1, wherein the difference of the temperatures of the batteries included in the battery module is the difference between temperatures of a battery with the highest temperature and a battery with the lowest temperature.

8. The storage battery apparatus according to claim 1, wherein the control unit is programmed to diagnose the abnormality of the plurality of temperature detectors if the fluid device is in operation and the temperature detected from an output signal of the second temperature detector is higher than the temperature detected from an output signal of the first temperature detector and is also higher than the temperature detected from an output signal of the third temperature detector.

9. The storage battery apparatus according to claim 1, wherein the control unit is programmed to diagnose the abnormality of the plurality of temperature detectors if the fluid device is in operation and the temperature detected from an output signal of the second temperature detector is lower than the temperature detected from an output signal of the first temperature detector.

10. The storage battery apparatus according to claim 1, wherein the control unit is programmed to diagnose the abnormality of the fluid device or the plurality of temperature detectors if the fluid device is in operation and the temperature detected from an output signal of the second temperature detector is equal to the temperature detected from an output signal of the first temperature detector.

11. A storage battery apparatus, comprising:
a battery module including one or more batteries;
a chassis having an inhaling port and a discharging port to house the battery module;
a cooling unit disposed on the chassis, and activated to introduce a cooling medium for cooling the batteries included in the battery module arranged in the chassis
a plurality of temperature detectors including:
a first temperature detector disposed at the inhaling port of the chassis to detect a temperature of the cooling medium at the inhaling port of the chassis;
a second temperature detector disposed at the discharging port of the chassis to detect a temperature of the cooling medium at the discharging port of the chassis; and
a third temperature detector arranged to detect a temperature of at least one of the batteries included in the battery module and the battery module; and
a control unit programmed to receive output signals from the first, second and third temperature detectors,
wherein the inhaling port and discharging port are separately disposed on both sides of the battery module,
wherein the plurality of temperature detectors are disposed at least at the inhaling port and discharging port of the chassis,
wherein the control unit is programmed to diagnose if the cooling unit and the first, second and third temperature detectors are abnormal based on an operation status of the cooling unit, an operation status of the battery module, and the temperatures detected from output signals of the first, second and third temperature detectors, and
wherein when the fluid device is in operation, the control unit is programmed to diagnose that:
the plurality of temperature detectors and the fluid device are normal, if the temperature of the cooling medium discharged from the chassis is higher than the temperature of the cooling medium introduced into the chassis, and is lower than the temperature of at least one of the batteries and the battery module;
the plurality of temperature detectors programmed to detect the temperature of the cooling medium discharged from the chassis is abnormal, if the temperature of the cooling medium discharged from the chassis is higher than the temperature of the cooling medium introduced into the chassis and is also higher than the temperature of at least one of the batteries and the battery module;
the plurality of temperature detectors programmed to detect the temperature of the cooling medium discharged from the chassis is abnormal, if the temperature of the cooling medium discharged from the chassis is lower the temperature of the cooling medium introduced into the chassis; and
the plurality of temperature detectors or the fluid device is abnormal if the temperature of the cooling medium discharged from the chassis is equal to the temperature of the cooling medium introduced into the chassis.

12. The storage battery apparatus according to claim 11, further comprising:

a reporting unit arranged to report abnormality, when the control unit diagnoses the abnormality of the first, second and third temperature detectors and the cooling unit.

13. The storage battery apparatus according to claim 12, further comprising:
a communication unit arranged to transmit information to a host system,
wherein, when abnormality of the first, second and third temperature detectors or the cooling unit is diagnosed, the control unit transmits diagnostic information about the abnormality to the host system, via the communication unit, so as to limit the charging and discharging of the battery module.

14. The storage battery apparatus according to claim 12, wherein the control unit is programmed to detect the temperatures of the batteries included in the battery module from the output signal of the third temperature detector, and causes, if the difference of the temperatures of the batteries included in the battery module exceeds a given threshold, the cooling unit to operate.

15. The storage battery apparatus according to claim 12, further comprising:
a communication unit arranged to transmit information to a host system,
wherein the control unit, if the difference of the temperatures of the batteries included in the battery module exceeds the given threshold, transmits information to the host system, via the communication unit, the information indicating that the difference of the temperatures of the batteries included in the battery module has exceeded the given threshold.

16. The storage battery apparatus according to claim 11, further comprising:
a reporting unit arranged to report abnormality,
wherein, when the difference of the temperatures of the batteries included in the battery module exceeds the given threshold, the reporting unit reports the abnormality so as to limit the charging and discharging of the battery module.

17. The storage battery apparatus according to claim 11, wherein the control unit is programmed to diagnose the abnormality of the first, second and third temperature detectors if the cooling unit is in operation and the temperature detected from the output signal of the second temperature detector is higher than the temperature detected from the output signal of the first temperature detector and is also higher than the temperature detected from the output signal of the third temperature detector.

18. The storage battery apparatus according to claim 11, wherein the control unit is programmed to diagnose the abnormality of the first, second and third temperature detectors if the cooling unit is in operation and the temperature detected from the output signal of the second temperature detector is lower than the temperature detected from the output signal of the first temperature detector.

19. The storage battery apparatus according to claim 11, wherein the control unit is programmed to diagnose the abnormality of the cooling unit or the first, second and third temperature detectors if the cooling unit is in operation and the temperature detected from the output signal of the second temperature detector is equal to the temperature detected from the output signal of the first temperature detector.

* * * * *